Oct. 23, 1928.  
G. K. HUNDLEY  
1,688,497  
AUTOMOBILE COMBINATION SIGNAL AND DIMMING LAMP  
Filed Feb. 17, 1923   3 Sheets-Sheet 1
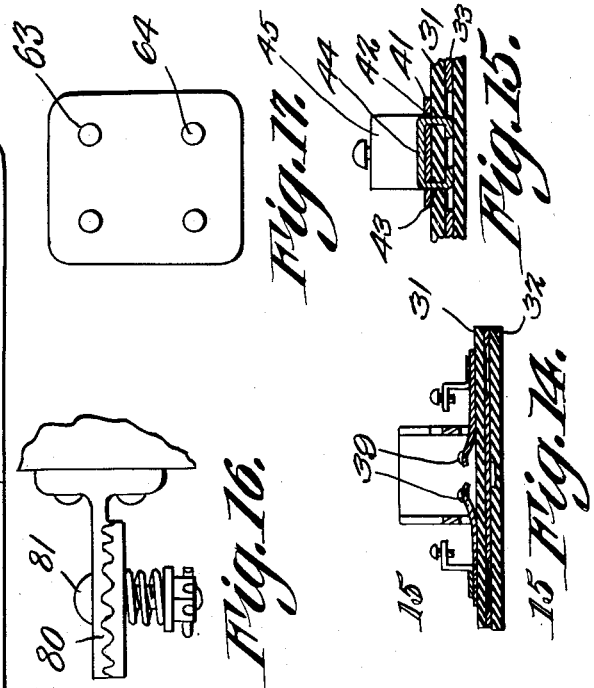
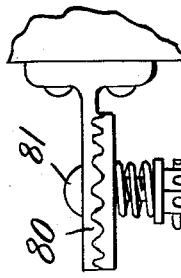
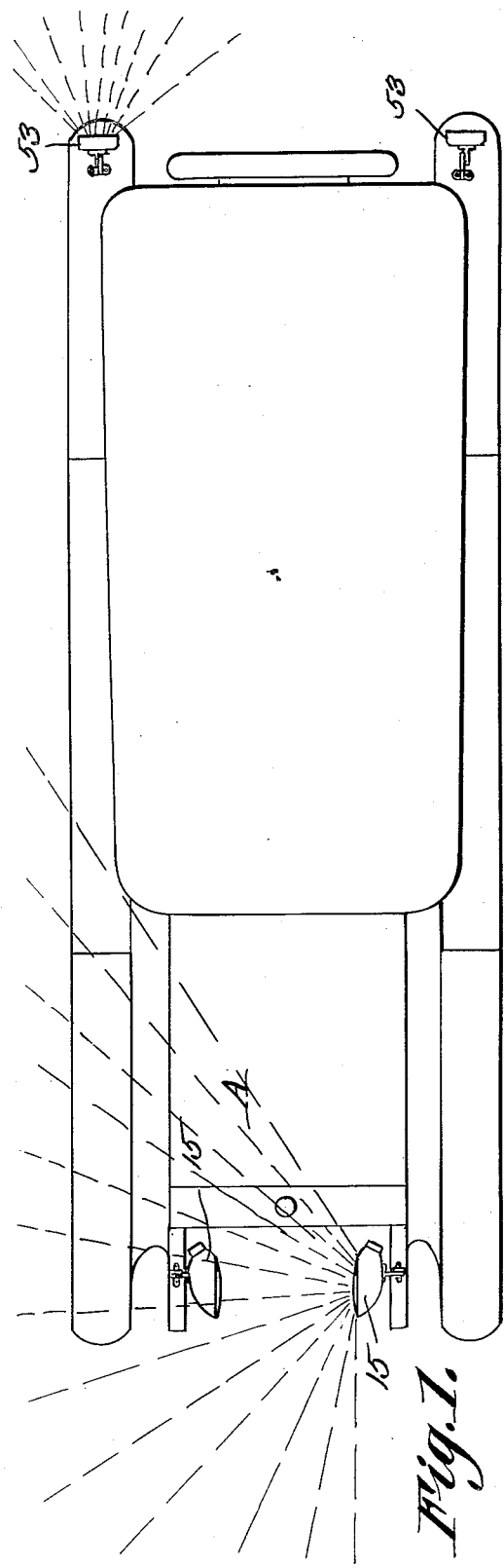
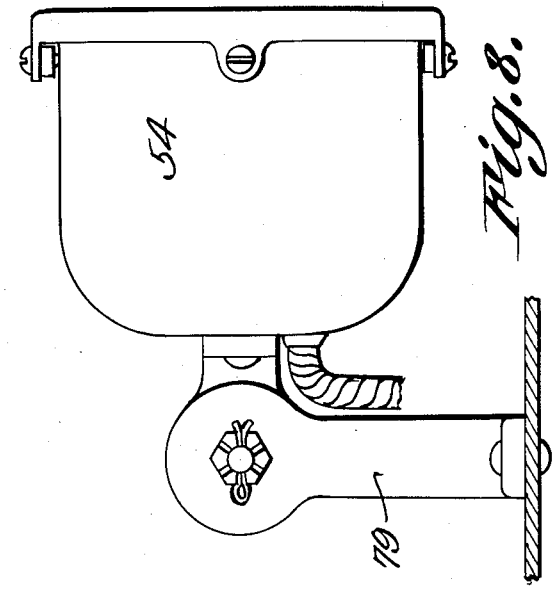
Inventor  
G. K. Hundley  
By C. A. Snow & Co.  
Attorneys.

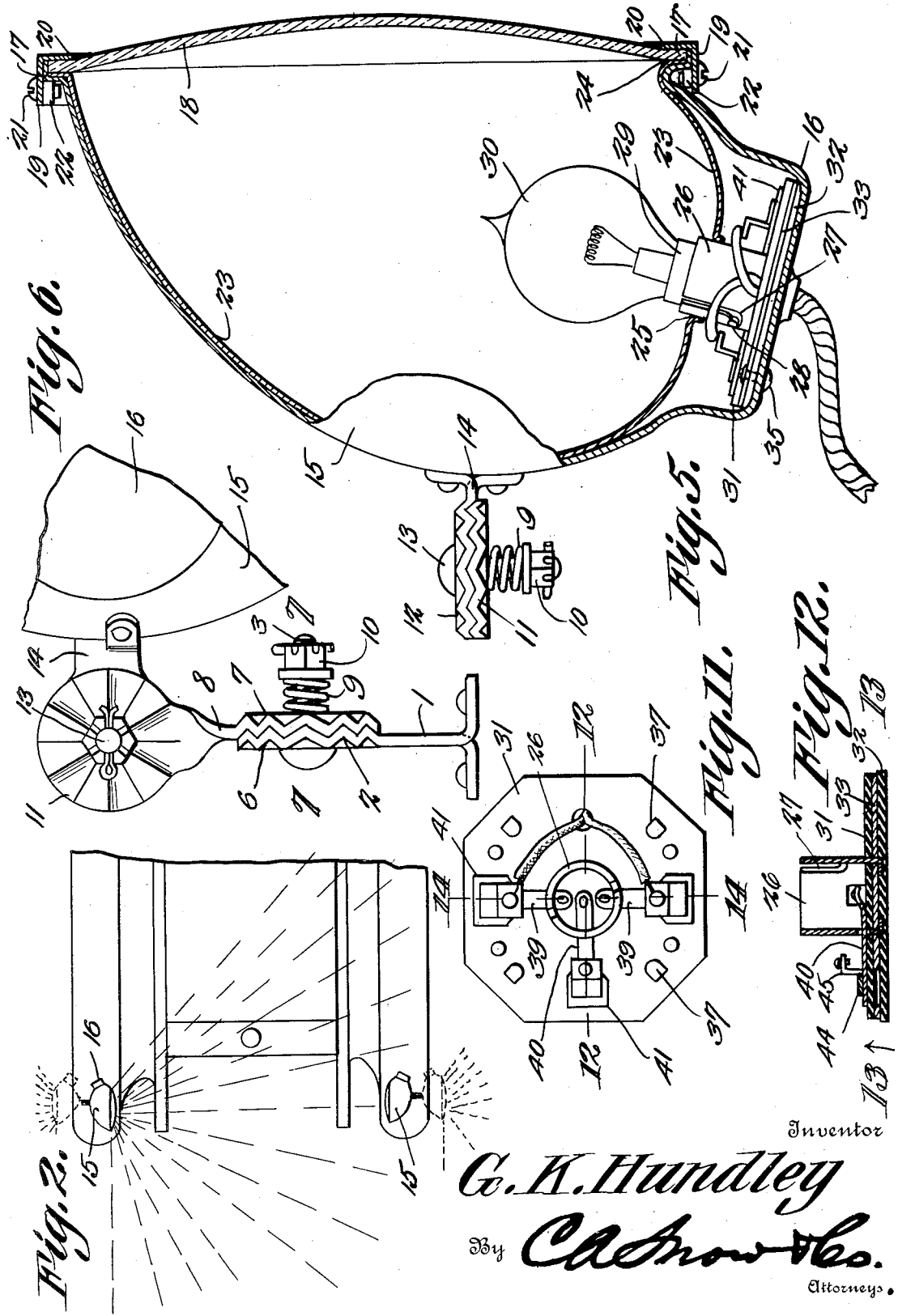

Oct. 23, 1928.  1,688,497
G. K. HUNDLEY
AUTOMOBILE COMBINATION SIGNAL AND DIMMING LAMP
Filed Feb. 17, 1923    3 Sheets-Sheet 3
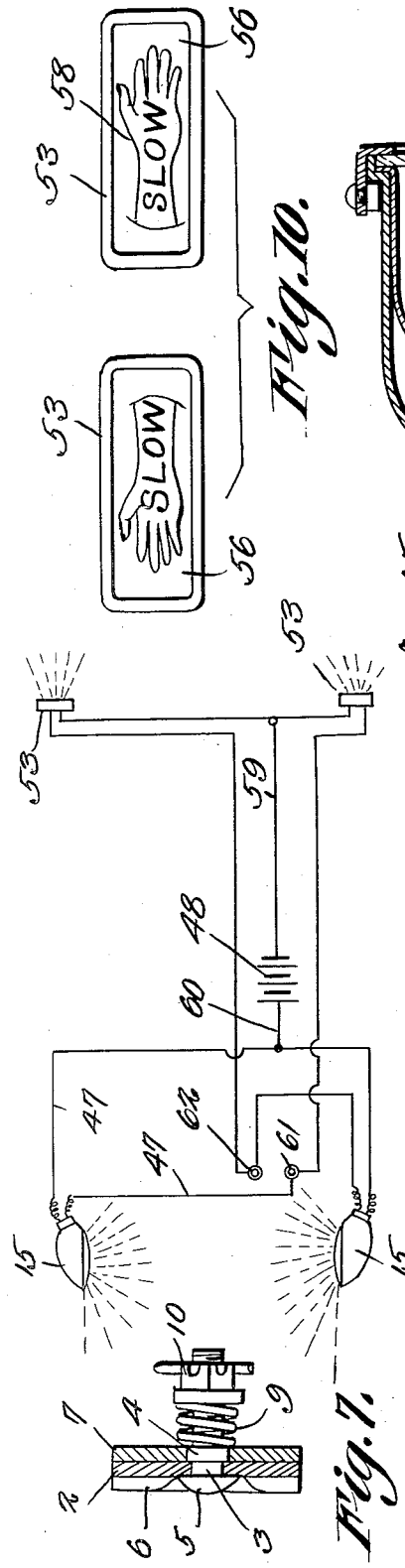
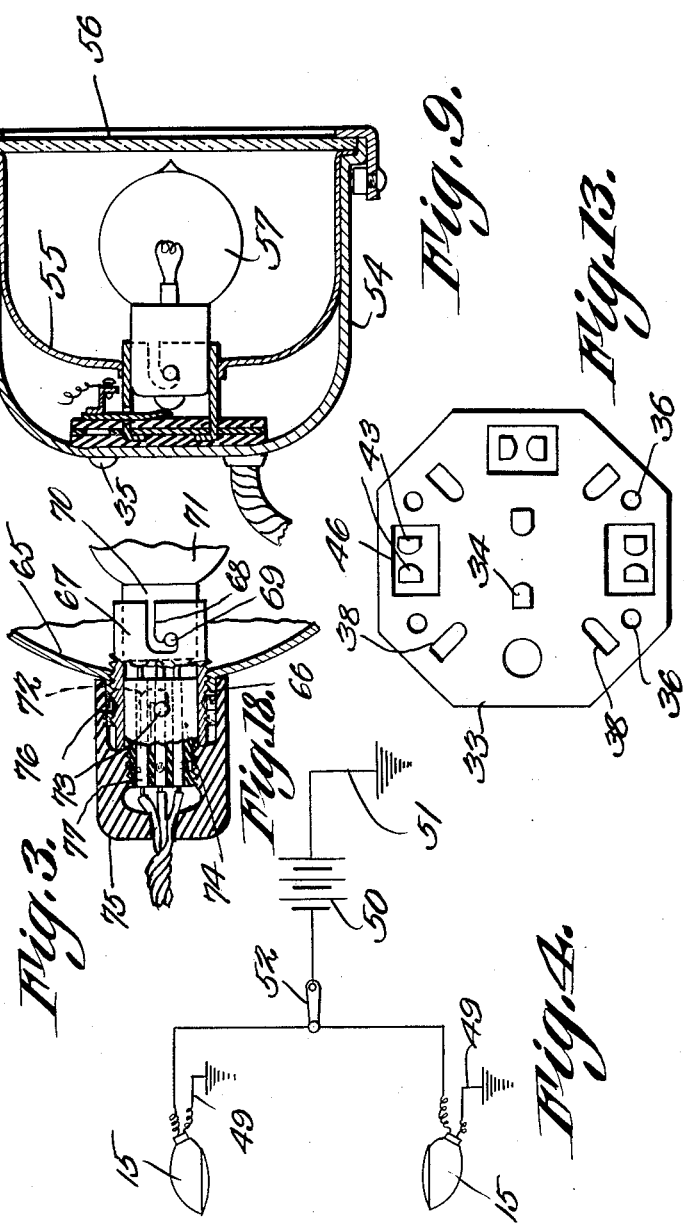
G. K. Hundley
Inventor
By C. A. Snow & Co.
Attorneys.

Patented Oct. 23, 1928.

1,688,497

UNITED STATES PATENT OFFICE.

GEORGE K. HUNDLEY, OF BECKLEY, WEST VIRGINIA, ASSIGNOR OF ONE-HALF TO JAMES HUNDLEY, OF NOBLESVILLE, INDIANA.

AUTOMOBILE COMBINATION SIGNAL AND DIMMING LAMP.

Application filed February 17, 1923. Serial No. 619,674.

This invention relates to combination signal and dimming lamps for automobiles, one of its objects being to provide lamps mounted in a novel manner at the sides of the front of an automobile whereby either or both of the lamps can be illuminated to throw light rays across the front end of the vehicle to light up the road at either or both sides as well as to illuminate the front of the machine and a portion of the road in the path thereof.

Another object is to provide lamps of peculiar construction the open faces of the housings of which are supported parallel with the path of movement of the automobile instead of at right angles thereto, as ordinarily, the construction of each housing being such as to direct light rays both transversely and forwardly relative to the vehicle.

A further object is to provide a lamp the housing of which acts as a shield to prevent glare in the eyes of the driver of an approaching vehicle.

A still further object is to provide lamps of this character which can be utilized as signals for indicating in which direction the vehicle is to turn, the lamps at the same time serving to illuminate that side of the road toward which the vehicle is to be turned.

Another object is to provide apparatus of this character the front or dimming lamps of which can be used to supplement the usual head lights or can be employed in lieu thereof.

A further object is to combine with the dimming lamps a pair of rear signal lamps adapted to be separately or simultaneously illuminated to indicate to the driver of a rear machine, the direction in which a turn is to be made; also whether the vehicle is to be slowed or brought to a stop.

A still further object is to provide a lamp housing of novel construction provided with improved means whereby either a single or double contact lamp can be positioned within the housing.

Another object is to provide lamp housings capable of adjustment to direct light rays transversely across the front end of the machine or laterally away from the machine, there being additional means for adjusting each lamp housing angularly about a transverse axis to vary the angle of the light rays relative to the surface of the road.

With the foregoing and other objects in view which will appear as the description proceeds, the invention consists of certain novel details of construction and combination of parts which will be hereinafter more fully described and pointed out in the claims, it being understood that changes may be made without departing from the spirit of the invention as claimed.

In the accompanying drawings the preferred form of the invention has been shown.

In said drawings,

Figure 1 is a plan view of an automobile having the present improvements combined therewith, the dimming lamps and rear signal lamps indicating that a turn is to be made toward the right.

Figure 2 is a plan view of the front end portion of the automobile showing one of the dimmer lamps illuminated to indicate a left turn and to illuminate the left side of the road toward which the turn is to be made, said lamps being shown by dotted lines in position for throwing light rays laterally away from the machine.

Figure 3 is a view showing in diagram the wiring of the apparatus, all lamps being illuminated to indicate a slowing down or a stop of the machine.

Figure 4 is a view showing in diagram a grounded circuit including dimming lamps only.

Figure 5 is an enlarged central horizontal section through one of the dimming lamps.

Figure 6 is an elevation of the supporting bracket of one of the dimming lamps.

Figure 7 is a section on line 7—7 Figure 6.

Figure 8 is a side elevation of one of the rear signal lamps and its supporting bracket.

Figure 9 is a section through the rear signal lamp.

Figure 10 is a rear elevation of the two rear signal lamps and showing the indicating signs thereon.

Figure 11 is an elevation of the socket structure for engagement by one of the lamps of the apparatus as shown, for example, in Figure 5 and illustrating means for operative engagement by either a single or double contact lamp.

Figure 12 is a section on line 12—12 Figure 11.

Figure 13 is a section on line 13—13 Figure 12.

Figure 14 is a section on line 14—14 Figure 11.

Figure 15 is a section on line 15—15 Figure 14.

Figure 16 is a plan view of a modified form of lamp supporting bracket.

Figure 17 is a face view of a push button switch for controlling the circuits to the lamps illustrated in Figure 3.

Figure 18 is a section through a modified form of socket for a lamp.

Referring to the figures by characters of reference 1 designates brackets secured to the front portion of an automobile A adjacent the sides thereof and this bracket has a terminal 2 through which is extended a bolt 3 having a collar 4 and a head 5, the terminal portion being held firmly between the collar and head as shown in Figure 7. Radial corrugations 6 are formed in the terminal portion 2 and are adapted to be engaged by similar corrugations formed in a disk 7 insertible onto the bolt 3 and having an arm 8 extending from its periphery. A spring 9 is mounted on the bolt and is pressed against disk 7 by a castellated nut 10 whereby the parts are held properly assembled. Arm 8 has a disk 11 at its outer end formed with radial corrugations and adapted to be engaged by a similar disk 12, there being a bolt 13 similar to the bolt 3 for holding the parts assembled for adjustment. Arm 14 is extended from disk 12 and is secured to the outer surface of the housing 15 of one of the dimming lamps. It will be obvious that by providing a bracket such as described arm 14 can be adjusted angularly about the bolt 13 while arm 8 can be adjusted angularly about the bolt 3. Thus the housing 15 can be brought to any desired position relative to the bracket 1 and will be properly supported.

Housing 15 is shaped substantially along the lines of an ovoid, it being provided with an open face disposed in a plane at one side of the longitudinal center of the ovoid and at a slight angle to the longitudinal axis. In other words the housing has the appearance of an ovoid with a segment removed along a plane disposed at a slight angle to the great diameter of the ovoid. This particular shape has been found of considerable importance because, as a result thereof, it is possible to throw the light rays in the directions desired, as will be hereinafter explained.

The housing 15 has a recessed extension 16 in which the lamp socket and its connection are mounted, this extension projecting rearwardly beyond the area defined by the walls of the open face of the housing. The housing wall is outturned and flanged around the open side of the housing, as shown at 17, thus to provide a seat for the marginal portion of the lens 18 of the housing. The lens is preferably held in place by a retaining ring 19 extending around the flanged portion 17 and having an inwardly extending flange 20 at its outer edge for lapping the lens as shown. Screws 21 are extended through the ring 19 and engage nuts 22 back of flange 17, thus to hold the ring 19 against removal from the housing and to secure the lens 18 firmly in position.

Housing 15 is provided with a reflector lining 23 which fits snugly within all portions of the housing except the extension 16 which is bridged by the reflector as shown in Figure 5. The edge of the reflector is outturned as at 24 so as to be clamped between the marginal portion of the lens 18 and the inner portion of the flange 17. An opening 25 is formed in that portion of the reflector bridging the extension 19 and this opening is designed to receive a socket 26 formed with the usual bayonet slots 27 for the reception of lugs 28 extending from the base or plug portion 29 of the lamp 30.

It will be noted that the lamp 30 is supported in that portion of the housing nearest the extension 16. As shown in Figures 1, 2, 3 and 4 the housings of the dimming lamps are disposed with their lenses 18 directed toward each other, the flat open faces of the housings being substantially parallel with the direction of movement of the automobile A. The extensions 16 constitute the rear portions of the housings and the forward portions of the housings obviously constitute shields which prevent the light rays from producing a glare in the eyes of a driver approaching the automobile. The reflector, by reason of its peculiar configuration, will disperse the light rays through the lens so as to illuminate the front of the automobile and produce an illuminated fan-shaped area when viewed in plan, as shown in Figures 1 and 2, some of the light rays being projecting substantially straight forward so as to illuminate the road in the path of the machine without producing a glare. Obviously the lamp at the right side of the machine will not only illuminate the road in front but also that portion of the road at the left of the machine. Likewise when the lamp at the left side of the machine is lighted that portion of the road in front of the machine will be illuminated as will also the portion at the right of the machine. Both lamps will illuminate the front end of the machine.

As indicated by dotted lines in Figure 2 the dimming lamp housings 15 can be shifted on their supports so as to throw the light rays laterally away from the machine instead of transversely in front of the machine. With this arrangement either side of the road could be illuminated.

One way in which the lamp 30 can be connected to its circuit has been illustrated in detail in the drawings. This mounting includes an inner thickness 31 of fibre or other insulating material, a base 32 of similar material, and an interposed plate 33 of conducting material. The socket 26 is formed with bendable ears 34 that are extended through the thickness 31 and the plate 33 and are bent toward each other, as shown in Figure 13, thus to hold the socket in place and electrically connected to the plate 33. Rivets 35 or the like connect the plate 33 to the housing extension 16, these rivets extending through the insulating base 32. Openings provided for the rivets have been illustrated at 36 in Figure 13. For the purpose of holding plate 33 assembled with the inner insulating strip or thickness 31 tongues 37 are struck from the plate and are inserted through the insulating strip 31 and bent over as shown in Figure 11. The openings formed in plate 33 by striking the tongues therefrom have been illustrated at 38 in Figure 13.

Mounted on the insulating strip 31 are opposed contacts in the form of spring tongues 39 the free ends of which are supported in the space surrounded by the socket 26. A third contact strip 40 extends between the strips 39. Each one of the contact strips has an enlarged outer end 41 provided with spaced slots 42 adapted to receive ears 43 extending from the sides of the base 44 of a bracket 45. These ears project through the insulating strip 31 and are bent back thereagainst as shown in Figure 15, the ends of the ears being located within openings 46 formed in the plate 33 so as thus to prevent contact between the ears and the plate. See Figure 13. The brackets 45 are for engagement by the terminals of the wires of the lamp circuit.

By providing a socket arrangement such as described either a single or a double contact can be used. If a double contact lamp is employed the two contacts thereof will engage the strips 39 connected by wires 47 to a battery or other source of electrical energy indicated at 48. If a lamp with a single contact is used said contact will engage the strip 40 so that a circuit will thus be established through the wire connected to said strip and through the socket 26 to the plate 33, housing 15 and thence to the return wire of the circuit or to the ground. In Figures 3 and 4 two kinds of circuits have been illustrated. Figure 3 shows a wired circuit while Figure 4 shows a grounded circuit. In Figure 4 each lamp has one terminal grounded as at 49 while its other terminal is electrically connected to the battery 50 or to any other suitable source of electrical energy which, in turn, is grounded as at 51. A switch 52 is provided for placing either or both lamps in circuit, this switch being located at any suitable point in convenient reach of the operator.

As shown in Figures 1 and 3 the dimming lamps may be combined with rear signal lamps indicated generally at 53. Each dimming lamp includes a housing 54 containing a reflector 55 and having a transparent or translucent rear face 56 formed of glass held to the housing in the same manner as has heretofore been described. A lamp 57 is provided in each housing and can be connected to its circuit by means of a socket structure such as heretofore described or by means of any other suitable connection. Two of these rear signal lamps are provided, one at each side of the machine and the rear wall of each lamp is preferably provided with a sign such as a hand 58. The hand on the right side of the machine is pointed toward the right while the hand on the left side of the machine is pointed toward the left. Each hand may contain the word "slow".

When rear signal lights are used the wiring is preferably such as has been illustrated in Figure 3. In this figure the battery has been illustrated at 48 and one pole of the battery is connected by a wire 59 to one terminal of each lamp in the housings 53. The other pole of the battery is connected by wire 60 to one terminal of each lamp in the housings 15. The other terminal of the lamp in the right hand housing 15 is connected electrically to the other terminal of the lamp in housing 53 at the left of the machine. This electrical connection includes a switch 61. An electrical connection is also provided between the second terminal of the lamp in the left hand housing 15 and the second terminal of the lamp in the right hand housing 53, this connection including as witch 62. Thus by shifting switch 61 to close the circuit controlled thereby, lamp housing 15 at the right of the machine and housing 53 at the left of the machine will be simultaneously illuminated. This will indicate to a driver approaching the automobile from the front and also to a driver approaching the machine from the rear, that the automobile is to turn toward the left and at the same time the right dimming light will illuminate the left side of the road so that the driver can see that portion of the surface on which the machine is to travel. By shifting switch 62 so as to close the circuit controlled thereby the other two lamp housings 15 and 53 will be illuminated to indicate a right hand turn and to light up the right hand side of the road. If both circuits are kept closed all four lamps will remain lighted as a signal that the machine is to slow down or stop. This signal will also warn a driver in rear thereof to watch out for a machine approaching from the front. If desired a switch can be suitably located for cutting out the rear signal lamps should it be desired not to use them while the front lamps are lighted. If preferred, and as already explained, the rear signal lamps need not be used. In that event a circuit such as shown in Figure 4 could be employed.

Any desired form of switch can be used for controlling each circuit. It is preferred, however, to use switches employing push buttons arranged in pairs as shown in Figure 17, one button 63 of each pair being depressible to close one circuit while the other button, 64, of each pair is depressible to open the circuit.

It is to be understood that instead of using a socket construction for each lamp as heretofore described other constructions may be used. One of these modified forms has been illustrated in Figure 18. In this figure a portion of the lamp housing has been illustrated at 65. This housing has a tubular extension 66 in which is screwed a sleeve 67. The sleeve has bayonet slots 68 extending into one end thereof for the reception of lugs 69 projecting from the base plug 70 of the lamp 71. By providing the threaded sleeve the lamp can be adjusted to change its focus. Additional bayonet slots 72 are extended into the other end of the sleeve to receive lugs 73 projecting laterally from a plug 74. This plug has a threaded end projecting outwardly from the sleeve for engagement by a cap 75 which houses extension 66. A screw 76 is mounted in extension 66 and engages the sleeve 67. This screw serves to hold the sleeve against rotation in the extension. The plug 74 is provided with the usual contact pins 77. It might be stated, however, that three of these pins are provided instead of two or one as heretofore, this arrangement of pins allowing the use of a single contact lamp or a double contact lamp as preferred.

The rear housings 54 are mounted on brackets 79 capable of angular adjustment. In the structure illustrated in Figure 8 and Figure 16 the bracket can consist of adjustably connected portions having contacting corrugated faces 80, these portions being connected by a bolt 81 similar to the bolt 3 heretofore described. In this form of bracket the parts are cast instead of being stamped from sheet metal.

What is claimed is:

1. A fender light comprising a casing, a lamp within said casing, a reflector having the inner side thereof curved forwardly of and inwardly toward the lamp and terminating in the longitudinal axis of the lamp and having the outer side thereof terminating substantially in the transverse axis of the lamp, said reflector being positioned in said casing and spaced from the rear thereof and means for supporting said fender light, substantially as set forth.

2. A fender light comprising a casing, a lamp within said casing, a reflector having the inner side thereof curved forwardly of and inwardly toward the lamp and terminating in the longitudinal axis of the lamp and having the outer side thereof terminating substantially in the transverse axis of the lamp, said reflector being positioned in said casing and spaced from the rear thereof and means for adjustably supporting said light comprising brackets having cooperating corrugated portions and spring means for maintaining said corrugated portions in engagement whereby adjustment of said casing is provided and the wires leading to the lamp are concealed between the reflector and the casing, substantially as set forth.

In testimony that I claim the foregoing as my own, I have hereto affixed my signature.

GEORGE K. HUNDLEY.